Jan. 16, 1968  L. E. COUBROUGH  3,363,658

STUD FOR TIRES AND THE LIKE

Filed Feb. 25, 1966

INVENTOR.
Lawrence E. Coubrough
BY
Barnard, McGlynn & Reising
ATTORNEYS

United States Patent Office 3,363,658
Patented Jan. 16, 1968

3,363,658
STUD FOR TIRES AND THE LIKE
Lawrence E. Coubrough, Wheatridge, Colo., assignor to Coors Porcelain Company, Golden, Colo., a corporation of Colorado
Filed Feb. 25, 1966, Ser. No. 530,185
6 Claims. (Cl. 152—211)

ABSTRACT OF THE DISCLOSURE

The subject matter of this invention is a stud for tires and the like to increase traction. The stud comprises a wear resistant hard body having a head portion at one end and a tip portion at the other end, the body having a concave taper from the head to the tip so as to have a generally concave frusto-conical shape. The terminal surface of the head portion has a tapered recess at the center thereof and is convex adjacent its periphery.

---

This invention relates to an improved stud for snow tires and the like, that is, a stud formed of hard material for imbedment in the rubber or other elastomeric material of a vehicle tire or the like to provide increased traction.

It is well known that the traction of vehicle tires on ice and snow can be greatly improved by providing the tread with protruding inserts of a hard material. In practice, this is accomplished by molding the tire with small cylindrical blind holes in the tread and then inserting headed studs into the holes. One of the more difficult problems is that of stud retention since the studs are subjected to considerable centrifugal force and this together with the natural flexing of the rubber can result in the studs being thrown from the tires particularly at high speed. Another problem is that of providing studs with uniformly good wear characteristics and yet which can be produced at reasonable cost. The tire studs of the present invention provide marked increases both in retention characteristics and in wear characteristics, and can be produced at low cost.

Figure 1:
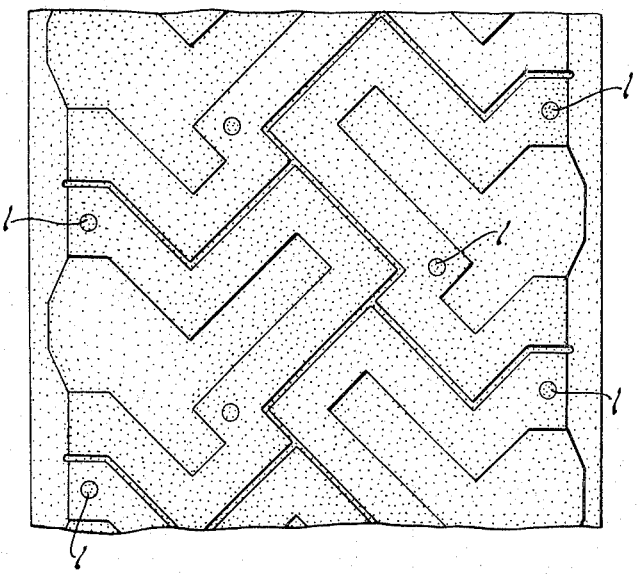
Figure 2:
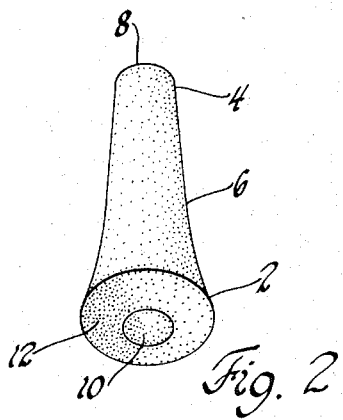
Figure 3:
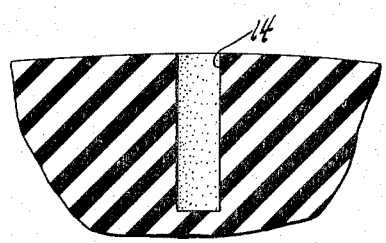
Figure 4:
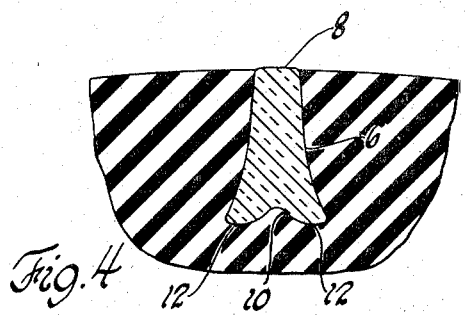

The invention will be described with reference to the accompanying drawings in which:

FIGURE 1 is a fragmentary plan view of the tread of a snow tire with the studs of the present invention inserted therein. FIGURE 2 is a perspective view of a tire stud made in accordance with the invention; FIGURE 3 is a sectional fragmentary view of a tire tread showing one of the cylindrical holes molded in the tread for reception of the tire stud; and FIGURE 4 shows the tire stud of FIGURE 2 inserted in the tire tread opening of FIGURE 3.

In FIGURE 1 there is shown a snow tire with the tread having the tire studs 1 of the present invention inserted therein as hereinafter described. Referring now to FIGURE 2, the tire studs comprise a wear resistant hard body, preferably ceramic as hereinafter described, having a head portion 2 of large cross-section at one end thereof and a tip portion 4 of small cross-section at the other end thereof, the side wall extending between the head and tip portions being concave and tapering from the one end to the other as shown at 6 in the drawing. Hence, the overall shape of the tire stud can be described as concavo frusto conical; i.e. generally frusto conical but with a concave rather than a straight taper from the large diameter to the small diameter end thereof. The end surface 8 of the tip can be either flat or with slightly rounded edges if desired and the terminal end of the head portion has a inwardly tapering recess 10 at the center thereof, the preferred shape being as shown in the drawings wherein the peripheral portions 12 of the head end surface are convex and with the center portion 10 concave.

The tire studs are preferably made of ceramic, by far the best ceramic being a high alumina body having a uniform high density and small alumina crystal structure all as described in United States Patent application Ser. No. 434,379, filed Feb. 23, 1965, in the name of Clarence E. Nordquist, and assigned to the assignee of the present invention.

The tire stud of this invention is highly advantageous in two respects. First, by way of the shape of the tire stud optimum uniform high density can be accomplished with the least trouble and expense. This is because the tire studs are best manufactured by first cold pressing the powdered ceramic material in a die, having the same shape as the stud, to thereby form a green compact after which the green compact is fired to sintering temperature. The concave tapered side walls of the stud provide optimum uniform compaction density in the pressing operation and therefore optimum density in the fired article since the ceramic powder as it is pressed can flow uniformly during the compaction from the head toward the tip end of the stud, there being no abrupt changes in the shape of the side wall to disturb the movement of the ceramic powder during pressing. Further, the concavity in the top surface of the head portion of the stud can be provided by a projection on the face of the punch used to compress the ceramic powder into the die opening and this assures optimum uniform compaction of the powder in the head portion of the stud. Hence, the green compact can be formed rapidly by the cold pressing operation and yet with optimum uniform high density because of the shape of the stud. A uniform high density provides improved strength and wear characteristics. The stud shape is also highly advantageous in that when the stud is inserted into a small diameter blind hole in the tire tread, there is optimum uniform contact between the rubber and the stud. This is because the stud is substantially of the same shape as that which the rubber walls of the cylindrical hole tend to assume when a large diameter stud head is inserted and bottomed in the hole. This can be seen in FIGURES 3 and 4, FIGURE 3 showing the small diameter hole 14 in the tire tread before insertion of the stud and FIGURE 4 showing the stud in place in the hole. It will be noted that the rubber makes contact with the stud over substantially the entire surface of the stud, this because the shape of the stud is substantially the same as that which the rubber would assume even if the entire tip and concave tapered portion of the stud were not present. A further advantage of this feature is that there is no substantial entrapment of air between the rubber and the stud. Hence, there is excellent retention of the stud within the tire tread thereby assuring against the studs being thrown from the tire at high speed. The length of the stud should preferably be about 1.5 to 2 times the diameter of the head portion and preferably the diameter of the head portion should be on the order of 1.5 to 2.5 times the diameter of the tip portion. The diameter of the tip portion should be somewhat greater than the diameter of the hole into which the stud is inserted. The recess 10 in the terminal surface of the head portion should preferably be shallow, with a depth not substantially greater than the diameter of the recess. In the embodiment shown the diameter of the recess is about one-third the diameter of the head and to obtain optimum advantage it is desirable that it not be less than this.

It will be understood that while the invention has been described specifically with reference to a preferred embodiment thereof various changes may be made all within the full and intended scope of the claims which follow.

The embodiments of the invention in which exclusive property or privilege is claimed are defined as follows:

1. A stud for substantial imbedment in elastomeric material and adapted to provide increased traction for tires and the like, said stud comprising a wear resistant hard body having a head portion of relatively large cross-section at one end thereof and a tip portion of relatively small cross-section at the other end thereof, said body having a concave taper from the head portion to the tip portion whereby said body has a generally concave frusto-conical shape, the terminal surface of said head portion having an inwardly tapering recess at the center thereof and being convex adjacent the periphery thereof.

2. A stud as set forth in claim 1 wherein said recess is of concave shape.

3. A stud as set forth in claim 1 wherein said stud is of circular cross-section throughout its length.

4. A stud as set forth in claim 3 wherein the length of said stud is about 1.5 to 2 times the diameter of the head portion.

5. A stud as set forth in claim 3 wherein the diameter of the head portion is about 1.5 to 2.5 times the diameter of the tip portion.

6. A tire comprising an elastomeric tread having openings therein, each of said openings having a natural shape of a right cylinder, and a stud in each of said openings, each of said studs comprising a wear resistant hard body having a round head portion of relatively large diameter located at the bottom of said opening and a round tip portion of relatively small diameter exposed at the surface of said tire tread, the terminal surface of said head portion having an inwardly tapering recess at the center thereof and being convex adjacent the periphery thereof and said stud being concavely tapered from said head portion to said tip portion whereby said stud has a generally concave frusto-conical shape, the shape of the walls of said opening in said tire tread being flexed by said stud to conform substantially to the shape of said stud.

References Cited

UNITED STATES PATENTS

| | | | |
|---|---|---|---|
| 1,189,223 | 7/1916 | Albrecht | 152—211 |
| 1,873,904 | 8/1932 | Pierce | 152—210 X |
| 3,125,147 | 3/1964 | Hakka | 152—210 |

ARTHUR L. LA POINT, *Primary Examiner.*

Y. P. SCHAEVITZ, *Assistant Examiner.*